United States Patent
Yin et al.

[11] Patent Number: 5,312,468
[45] Date of Patent: May 17, 1994

[54] OPTICAL FIBER CLEAVAGE METHOD

[75] Inventors: Huan B. Yin, Mennecy; Robert J. Ferina, Jr., Vincennes, both of France

[73] Assignee: Radiall, Rosny-sous-Bois, France

[21] Appl. No.: 939,138

[22] Filed: Sep. 3, 1992

[30] Foreign Application Priority Data

Sep. 6, 1991 [FR] France .................. 91 11061

[51] Int. Cl.⁵ .......................... C03B 37/023
[52] U.S. Cl. .......................... 65/2; 65/3.11; 65/10.2; 65/70
[58] Field of Search ............ 65/2, 3.11, 10.2, 70

[56] References Cited

U.S. PATENT DOCUMENTS

| | | |
|---|---|---|
| 4,621,895 | 11/1986 | Motsko . |
| 4,662,710 | 5/1987 | Berge .................. 65/10.2 X |
| 5,199,966 | 4/1993 | Harvey et al. .................. 65/3.11 X |

FOREIGN PATENT DOCUMENTS

| | | |
|---|---|---|
| 0287474 | 10/1988 | European Pat. Off. ............ 65/10.2 |
| 0442202 | 8/1991 | European Pat. Off. . |
| 2646521 | 11/1990 | France . |
| 58-121002 | 7/1983 | Japan . |
| 9003338 | 4/1990 | PCT Int'l Appl. .................. 65/10.2 |

Primary Examiner—Robert L. Lindsay
Attorney, Agent, or Firm—Schweitzer Cornman & Gross

[57] ABSTRACT

The invention relates to optical fiber cleavage method making it possible to obtain an oblique optical fiber end face, consisting in holding a segment of optical fiber between two separated supports, in displacing one of said supports with respect to the other, and in causing the cleavage of the fibre in a break zone dictated by an onset of breakage made by means of a tool, such as a blade.

The fiber (4) is held embedded in said supports (1, 2) without exerting any stress on it, in particular any traction or torsion, one of the supports (1) is displaced solely in translation along an axis perpendicular to the axis of the fiber (4) whilst holding the other support (2) fixed, and the onset of breakage is made either before, during, or after said displacement of the movable support.

6 Claims, 3 Drawing Sheets

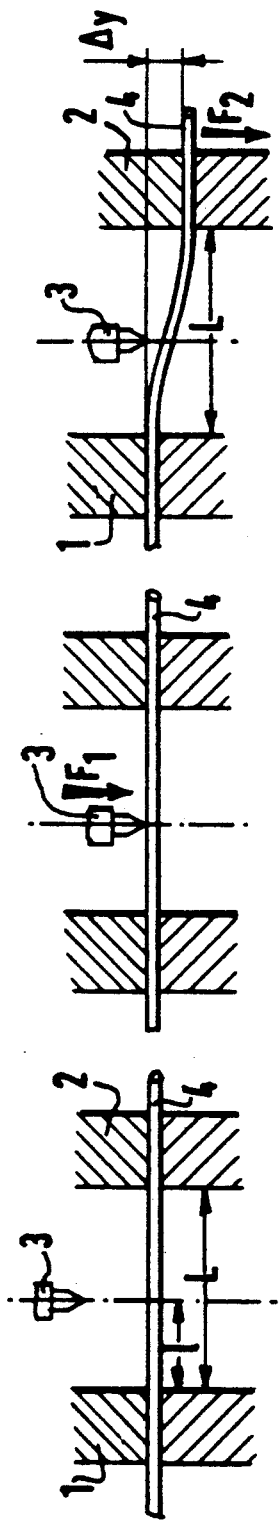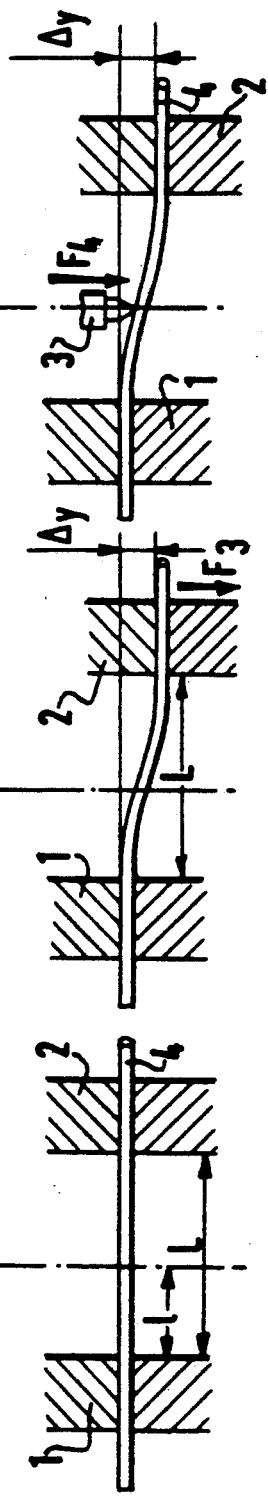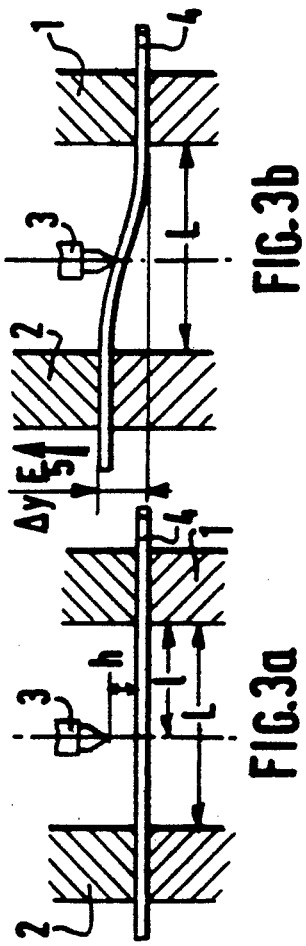

OPTICAL FIBER CLEAVAGE METHOD

BACKGROUND OF THE INVENTION

The present invention relates to an optical fiber cleavage method and in particular a method making it possible to obtain by cleavage an oblique optical fiber end face.

In order to reduce reflection in the vicinity of an optical fiber connection, use is made of optical fibers of the type in which the end face of the fiber is oblique, that is to say not perpendicular to the axis of the fiber.

It is important in practice to minimize reflection of the signal transmitted over the end face of an optical fibre especially when using high-output DFB lasers.

Various methods are known for producing an oblique face at the end of an optical fiber.

Thus, a first method consists in immobilizing the fiber by cementing into a support and in polishing the fiber, this method being used above all when the end of the fiber is mounted in a ferrule.

A second, more economical method makes it possible to obtain an oblique face directly by fracture or cleavage of the optical fiber. According to this method, tension and torsion are exerted on a segment of the fiber held in separated supports, and an onset of breakage is made at a point of the segment by means of a tool such as a blade, in such a way as to determine the site of the fracture accurately.

Although the latter method is fairly easy to implement for a single fiber, it is however very difficult, or even impossible, to use for a flat cable containing several closely spaced fibers owing to the need to apply, to each fiber of the cable individually, a torsion at its end.

SUMMARY OF THE PRESENT INVENTION

The present invention aims to provide a simple and economical method for cleavage of an optical fiber, making it possible to obtain an oblique end face, that is to say making a non-zero angle with the plane normal to the axis of the fiber, and the form of which is moreover suited to reducing reflection of the transmitted signal.

The method according to the invention consists in holding a segment of optical fiber between two separated supports, in displacing one of said supports with respect to the other, and in causing the cleavage of the fibre in a break zone dictated by an onset of breakage made by means of a tool, such as a blade, wherein the fiber is held embedded in said supports without exerting any stresses on it, in particular any traction or torsion, and wherein a first support is displaced solely in translation along an axis perpendicular to the axis of the fiber whilst holding the second support fixed, and wherein the onset of breakage is made either before, during, or after said displacement of the movable support.

Preferably, the two supports are a length apart of between ten and twenty times the diameter of the fiber, most preferably fourteen times, the separation between the supports being kept constant throughout the phase of displacement of the movable support.

The embedding of the fiber in the supports is done in such a way that the fiber is simply held straight between the supports, without generating stresses.

The displacement of the movable support takes place advantageously over a length of between 0.7 and 2 times the diameter of the fiber, preferably 1 times.

This displacement exerts, on the fiber, a bending stress, a tensile stress and a shear stress.

A notable advantage of the method of the invention lies in the form of these stresses over any cross section of the fiber included between the two supports.

On the one hand, the shear stress obtained in accordance with the invention varies parabolically along the axis of displacement of the movable support and encounters its maximum on the diameter of the fiber perpendicular to this axis.

On the other hand, the resultant of the tensile and bending stresses is parallel to the plane determined by the axis of the fiber and the axis of displacement of the movable support and is inclined in the direction of this displacement.

Consequently, stresses able to generate an oblique fracture are exerted on any cross section of the optical fiber included between the two supports. Furthermore, by implementing the method according to the invention, the angle of fracture, that is to say the angle included between the normal to the face of the fractured fiber and the axis of the fiber, is a maximum at the center of said break face, in the neighborhood of the axis of the fiber.

Moreover, the bending stress which is a maximum at the support embedding points and zero in the middle of the two supports varies along the fiber, thus modifying in particular the orientation of the resultant stress at the center of the fiber.

It therefore suffices to determine the position of the break zone between the two supports in order to determine the angle of fracture of the fiber.

In a first mode of implementation of the invention, the onset of breakage determining the fracture zone is made on the fiber before displacing the movable support. This method is advantageous when a very high accuracy is required in the determination of the position of fracture.

In a second mode of implementation, said movable support is firstly displaced, then the tool is displaced until it contacts the fiber so as to produce the onset of breakage, causing fracture.

According to a third mode of implementation, a fixed tool is used and the movable support is displaced in order to bring the fiber into contact with the tool and to produce the onset of breakage, causing fracture.

In order to aid understanding of the invention, some non-limiting embodiments thereof will now be described with reference to the attached drawing in which:

DESCRIPTION OF THE DRAWINGS

FIGS. 1a to 1c represent diagrammatically in section the steps of a first mode of implementation of a method according to the invention, FIGS. 2a to 2c represent diagrammatically in section the steps of a second mode of implementation of the method according to the invention, FIGS. 3a and 3b represent diagrammatically in section the steps of a third mode of implementation of the method according to the invention.

Figure 4:
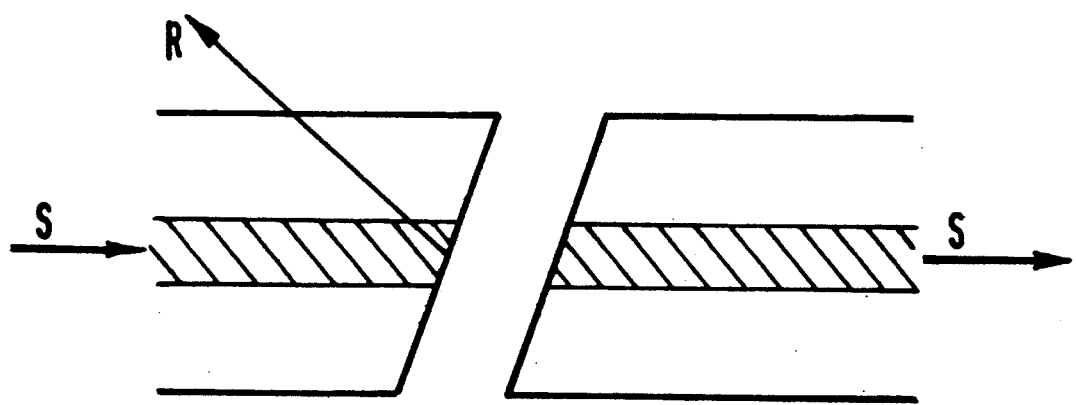
FIG. 4 is a diagrammatic view of an optical fiber connection zone illustrating a loss by reflection incurred by a transmitted signal.

For greater clarity, the figures have not been drawn to scale.

In the three modes of implementation illustrated, 1 denotes a fixed support, 2 a movable support, 3 a blade such as a diamond, and 4 an optical fiber.

DETAILED DESCRIPTION OF THE INVENTION

FIGS 1a, 2a and 3a illustrate the fiber 4 embedded in the two supports 1 and 2, the blade 3 being arranged above the fiber 4. The supports 1 and 2 in this assembly are a length L apart which is equal to 1.43 mm and the blade 3 is a distance 1 which is equal to 0.64 mm from the support 1.

In FIG. 1b, the blade 3 has been brought into contact with the fiber 4 through a downward displacement manifested by the arrow F1, in order to produce the onset of breakage in the fiber 4 at a precise distance 1 from the fixed support 1.

In FIG. 1c, the movable support 2 has been translated by a length $\Delta y$ downwards as indicated by the arrow F2. The support 1 has remained stationary and the distance L separating the two fixing supports has remained constant. FIG. 1c shows the fiber 4 just before breakage.

In the embodiment of the invention represented in FIGS. 2a to 2c, the movable support 2 is firstly displaced by a length $\Delta y$ in the direction of arrow F3. The distance L separating the two fixing supports is held constant.

The blade 3 is displaced downwards until it contacts the fiber 4, as manifested by arrow F4, in order to produce the onset of breakage on the fiber and breakage of the fiber. FIG. 2c shows the fiber 4 just before breakage.

In the embodiment of FIGS. 3a and 3b the blade 3 is held stationary a distance h from the fiber whilst the movable support 2 is displaced in translation along arrow F5. Aside from the generation of stresses in the fiber 4, placement thereof in contact with the blade 3 comes about when the movable support (2) has covered a distance $\Delta y$. This placing of the fiber in contact with the blade causes the onset of breakage and the breakage of the fiber. FIG. 3b represents the fiber 4 just before breakage.

By way of example, with an optical fiber having an optical sheath diameter of 125 $\mu$m, with a displacement $\Delta y$ of 0.116 mm, and the values 1 and L indicated earlier, the angle of break $\alpha_1$ (illustrated in FIG. 9) obtained at the center of the face of the fiber between the normal to this face and the axis of the fiber is around 12°.

The spread in the values of the angle $\alpha$ which are obtained when producing several fractures according to the method of the invention is small, which shows that, by virtue of the invention, optical fiber end faces can be made with a well-determined inclination making it possible to produce connections of optical fibers with oblique end faces of high quality.

FIG. 4 represents diagrammatically an optical fiber connection traversed by a signal S. In this figure it is seen that, at the interface of the fibers, the signal S is partially reflected on an end face to give a reflected signal R.

In particular, since the core of the fiber is the principal vector of the optical signal, it is important for the central portion of the end face of the fiber to exhibit sufficient obliqueness.

Figure 5:
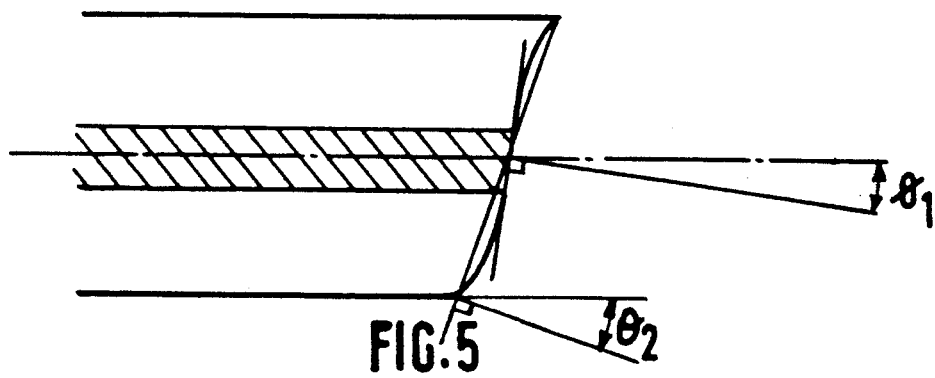
FIG. 5 represents a sectional view of an oblique end of an optical fiber obtained by cleavage according to the prior art.

FIG. 5 represents a sectional view of an oblique end of an optical fiber obtained by cleavage according to the prior art. Notice in particular that the angle $\theta_1$ at the center of the face of the fiber between the normal to this face and the axis of the fiber is less than the global angle of inclination of the face of the fiber $\theta_2$.

Figures 6, 7:
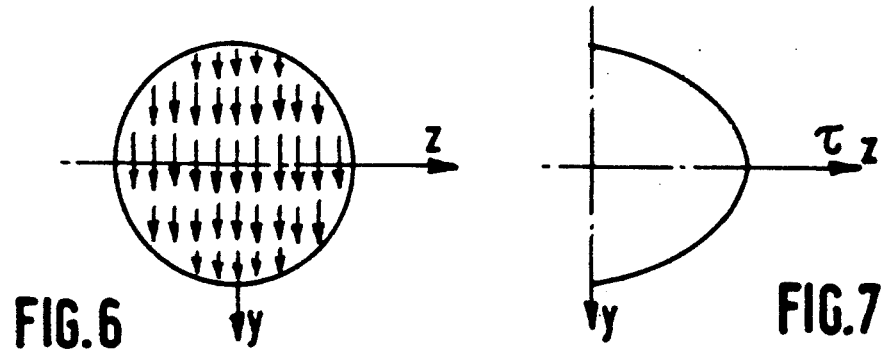
FIG. 6 represents a diagrammatic view of the distribution of the shear stress over a cross section of the fiber when implementing the method according to the invention.
FIG. 7 is a graphical representation of the magnitude of the stress of FIG. 6.

In FIG. 6 the distribution of the shear stress is seen, diagrammatically represented by vertical arrows, over an arbitrary cross section of the fiber according to the invention. In this figure, Y denotes the axis of displacement of the movable support and Z the middle axis of the fiber perpendicular to Y.

FIG. 7 shows the form $\tau$ of the magnitude of the stress of FIG. 6 which is seen to vary parabolically along the Y axis with a maximum on the Z axis.

Figure 8:
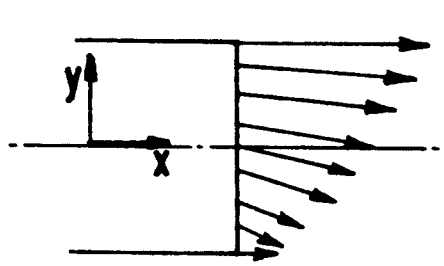
FIG. 8 represents a diagrammatic view of the distribution of the resultant of the tensile and bending stresses over a cross section of the fiber when implementing the method according to the invention.

FIG. 8 represents the distribution of the resultant of the tensile and bending stresses over the cross section of the fiber to be fractured and prepared in accordance with the invention. There is again found the axis Y of displacement of the movable support, and the axis X of the fiber, said resultant lying in the plane containing the axes X and Y and being inclined towards said displacement. It is this resultant stress which generates the oblique fracture, with, by virtue of the implementation of the invention, a maximum angle of fracture in the region situated in the neighborhood of the axis of the fiber.

Figure 9:
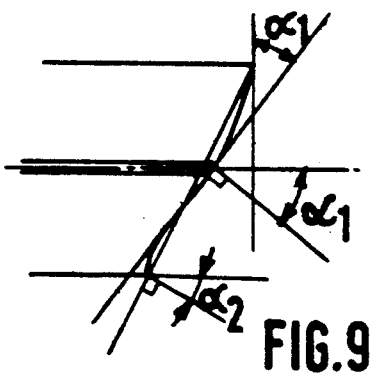
FIG. 9 represents a sectional view of an oblique end of an optical fiber obtained by the method of the present invention.

This angle $\alpha_1$ between the normal at the center of the face of the fiber and the axis of the latter is seen in FIG. 9, and it is noted that it is indeed the maximum angle of obliqueness of the end face of the fiber throughout its cross section, this angle $\alpha_1$, being, contrary to the prior art illustrated in FIG. 5, greater than the global angle of inclination of the face of the fibre $\alpha_2$.

The method of cleavage according to the invention can easily be applied to the simultaneous fracture of several very closely spaced parallel optical fibers within the same flat cable.

Figure 10:
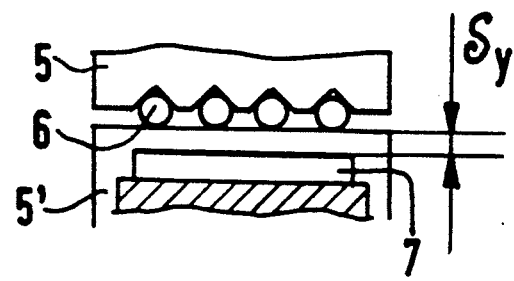
FIG. 10 represents a sectional view of a cleavage device enabling the method according to the invention to be implemented simultaneously on several optical fibers.
Figure 11:
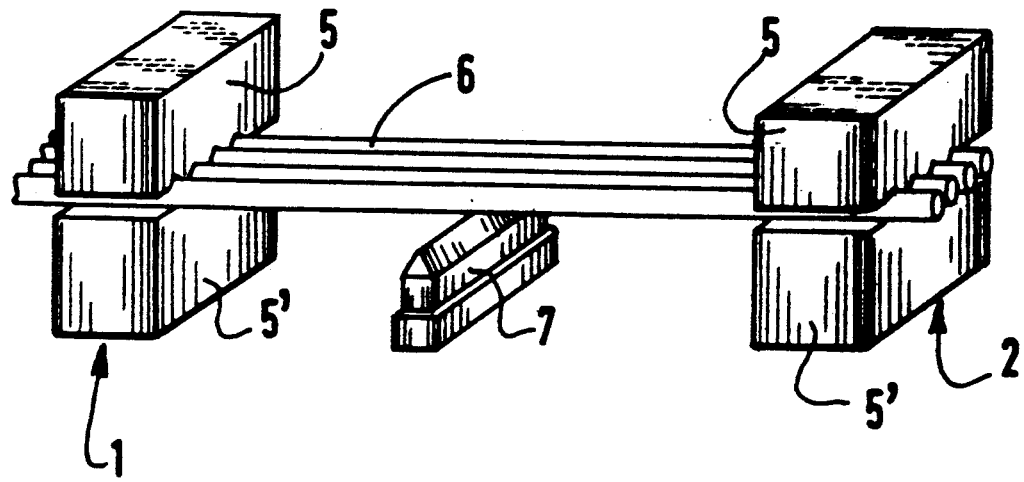
FIG. 11 represents a perspective view of the device of FIG. 10.

An illustration of a device which can be used to this effect is given in FIGS. 10 and 11.

In these figures, each of the four fibers 6 is embedded in supports 1 and 2 each consisting of a block 5 provided with grooves of, for example, triangular cross section and with a block 5', for example straight-faced, and 7 denotes a single blade which produces the onset of cleavage in the four fibers simultaneously, before, during or after the displacement of the movable support, as explained earlier.

Of course, diverse variants and modifications can be made to the above description without however departing from the scope of the invention.

I claim:

1. A method for cleaving an optical fiber having a substantially round cross section and a longitudinal axis, the cleaving being carried out along a plane that is at an oblique angle relative to the longitudinal axis of the optical fiber, comprising
   (i) disposing a segment of said optical fiber along its longitudinal axis between first and second supports spaced from each other by a predetermined distance,
   (ii) displacing said first support relative to the position of said second support which is maintained in its original position, said displacement taking place in a direction substantially perpendicular to the longitudinal axis,
   (iii) notching said optical fiber by contacting said optical fiber with notching means between said first and second supports, by relative movement between said optical fiber and said notching means, said notching being carried out before, during, or after said displacing of said first support.

2. The method of claim 1, wherein said predetermined distance is from 10 to 20 times the diameter of said optical fiber.

3. The method of claim 1, wherein said displacing takes place over a distance of from 0.7 to 2 times the diameter of said optical fiber.

4. The method of claim 1, wherein said displacing takes place over the same distance as the diameter of the optical fiber.

5. The method of claim 1, wherein a plurality of optical fibers are simultaneously cleaved, said plurality of optical fibers being maintained substantially stress free in a single plane in said first support and in said second support.

6. A method for simultaneously cleaving a plurality of optical fibers each having a substantially round cross section and a longitudinal axis, the cleaving being carried out along a plane that is at an oblique angle relative to the longitudinal axis of the optical fiber, comprising
   (i) retaining said plurality of optical fibers substantially stress free in a single plane both in a first support and in a second support, said first and said second supports being spaced from each other along the length of the optical fibers by a distance of from 10 to 20 times the diameter of an optical fiber,
   (ii) displacing said first support relative to the position of said second support which is maintained in its original position, by a distance of from 0.7 times to 2 times the diameter of an optical fiber, said displacement taking place in a direction substantially perpendicular to said longitudinal axis, and
   (iii) contacting said optical fibers with notching means for cleaving them between said first and said second support, before, during, or after said displacing of said first support, by relative movement between said optical fibers and said notching means.

* * * * *